(12) United States Patent
Hudson

(10) Patent No.: US 8,259,234 B2
(45) Date of Patent: Sep. 4, 2012

(54) SYSTEM AND METHOD TO INSERT A PERSON INTO A MOVIE CLIP

(75) Inventor: Jonathan Evan Hudson, Toms River, NJ (US)

(73) Assignee: Jonathan Hudson, Toms River, NJ (US)

( * ) Notice: Subject to any disclaimer, the term of this patent is extended or adjusted under 35 U.S.C. 154(b) by 1720 days.

(21) Appl. No.: 11/583,268

(22) Filed: Oct. 19, 2006

(65) Prior Publication Data

US 2007/0242161 A1    Oct. 18, 2007

Related U.S. Application Data

(60) Provisional application No. 60/728,053, filed on Oct. 19, 2005, provisional application No. 60/780,737, filed on Mar. 9, 2006.

(51) Int. Cl.
*H04N 9/74* (2006.01)

(52) U.S. Cl. ............................. 348/586; 348/598
(58) Field of Classification Search ............ 348/586, 348/584, 587, 588, 590–592, 598; *H04N 9/74*, *H04N 9/76*
See application file for complete search history.

(56) References Cited

U.S. PATENT DOCUMENTS

| 6,262,778 B1* | 7/2001 | Nonweiler et al. | 348/586 |
| 6,571,012 B1* | 5/2003 | Pettigrew | 348/592 |
| 2006/0221248 A1* | 10/2006 | McGuire et al. | 348/587 |

* cited by examiner

*Primary Examiner* — Sherrie Hsia

(57) ABSTRACT

Disclosed is a method for replacing people in a scene of a film with other people by removing the original people with video space-time completion of the film and inserting the other people with video processing software with user input. The method segments automatically the film with the original people and segments automatically the film with the other people.

4 Claims, 3 Drawing Sheets

SYSTEM AND METHOD TO INSERT A PERSON INTO A MOVIE CLIP

CROSS REFERENCE TO RELATED APPLICATIONS

This application claims the benefit of U.S. Provisional Patent Application Ser. No. 60/728,053 filed 2005 Oct. 19 by the present inventor and Gene Simko both of which are incorporated by reference in their entirety and 60/780,737 filed 2006 Mar. 9 by the present inventor.
PROGRAM: Appendix A ("SConstruct",) B ("av.h",) C ("av.cpp",) D ("pyav.i",)

FIELD OF THE INVENTION

This invention generally relates to video editing software and processes, specifically to compositing and video editing techniques.

BACKGROUND OF THE INVENTION

The problem is to insert a person into an already completed film in such a way that it can be automated, done in large quantities, and personalized at the same time. Previously, this specific problem has not been approached in this context before.

Movie studios have used techniques to replace individuals within some completed video with an actor to produce scenes such as Tom Hanks as Forrest Gump meeting President Nixon. Usually, blue-screens are utilized to extract the subject and the resulting matte is carefully overlapped upon the original film. Standard compositing techniques are used to counter lighting deficits and other problems.

First of all, the process utilized by the move studios focuses on inserting a specific actor into a specific scene. The movie studio's process typically operates on an incomplete film.

One common process consists of inserting a child or portion of a child into a cartoon. Video of the child must be taken against a solid color background. Another process involves putting an ordinary person into a pose against a blue-screen and compositing them against scenery like the sky. The invention is based on the scene of the film and its content and not just on scenery.

Many foreground and background separation and extraction methods are restricted to identifying one object at a time. In addition, user input is needed usually to identity the general region for the foreground. Eigenvalue-based methods are often significantly too slow for practical use. Previous edge-based graph methods provided poorer results. For instance, regions of different objects with similar intensity are joined. Sometimes the error approximation is poorly understood.

SUMMARY OF THE INVENTION

Accordingly, a method for replacing original people in a scene of a film with other people comprises providing video of said other people, providing video of the film into which said people are to be inserted, processing the video of film with video processing software whereby, with user input to the software, a first matte including original people in the video of film and a second matte including the other people to be inserted are recognized, and conducting video space-time completion whereby the first matte is removed from the video of film and the second matte is merged with the video of film are recognized, conducting video space-time completion of the video of film whereby the first matte is removed from the video of film, and merging the second matte with the video of film.

Accordingly, a process for segmenting video from a set of user parameters is provided, comprising segmenting video data using a controller and memory by converting said video data into a graph with weighted edges, whose said weights are computed from multiple kinds of measurements of pixels within the video data, and sorting the graph into groups based on said weights of said graph.

In one aspect, the method provides an enjoyable product in which one sees oneself in a favorite film.

In one aspect, the interactive video processing software provides a quick, simple, and effective method to segment video data into objects.

In one aspect, the method can form a franchise, online service, or other form of business.

DRAWINGS—FIGURES

DETAILED DESCRIPTION

Figure 1:
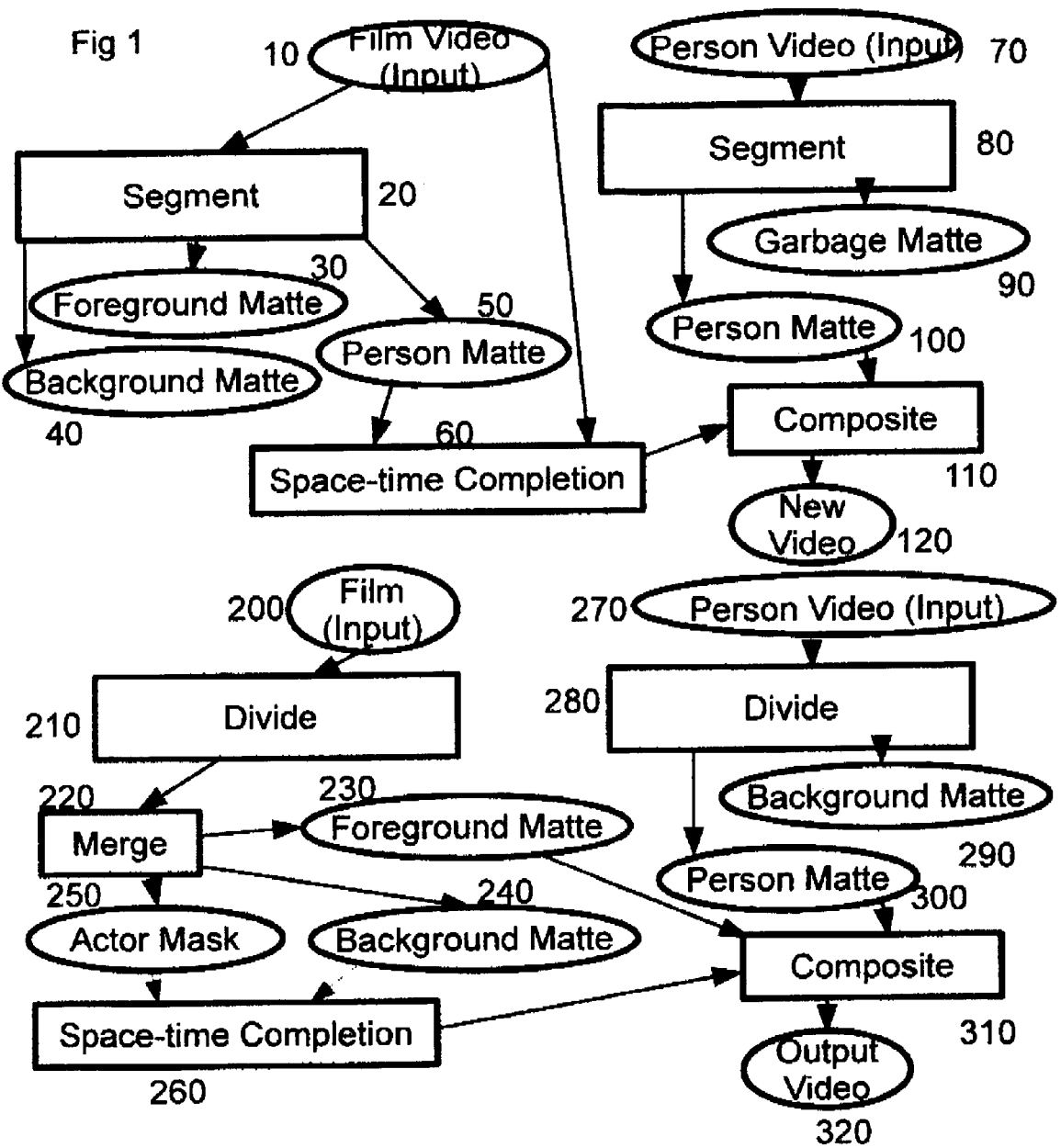
FIG. 1 is a flowchart of the video processing method for replacing original people in a scene of a film with other people comprises providing video of said other people.

FIG. 1 illustrates one of the embodiments of the invention. The two inputs are one a scene of a digitized film and video of the person. First the inputs (10, 70, 200, 270) are segmented (20, 80, 210, 280, 220) such that masks of the individual entities in the videos are made. Then, for the film input, the different masks are grouped into three categories—actor, background, and foreground masks—and used to separate the film in those three corresponding mattes (30, 40, 50, 230, 240, 250). For the person video (70, 270), the masks are grouped into person and garbage masks and then used to separate the video into person and garbage mattes (90, 100, 290, 300). The actor and garbage mattes are discarded. Space-time completion (60, 260) is run on the background using the actor mask to indicate the missing data. The resulting matte and the foreground matte and the person matte are composited (110, 310) in the proper order to product the output video (120, 320).

Figure 2:
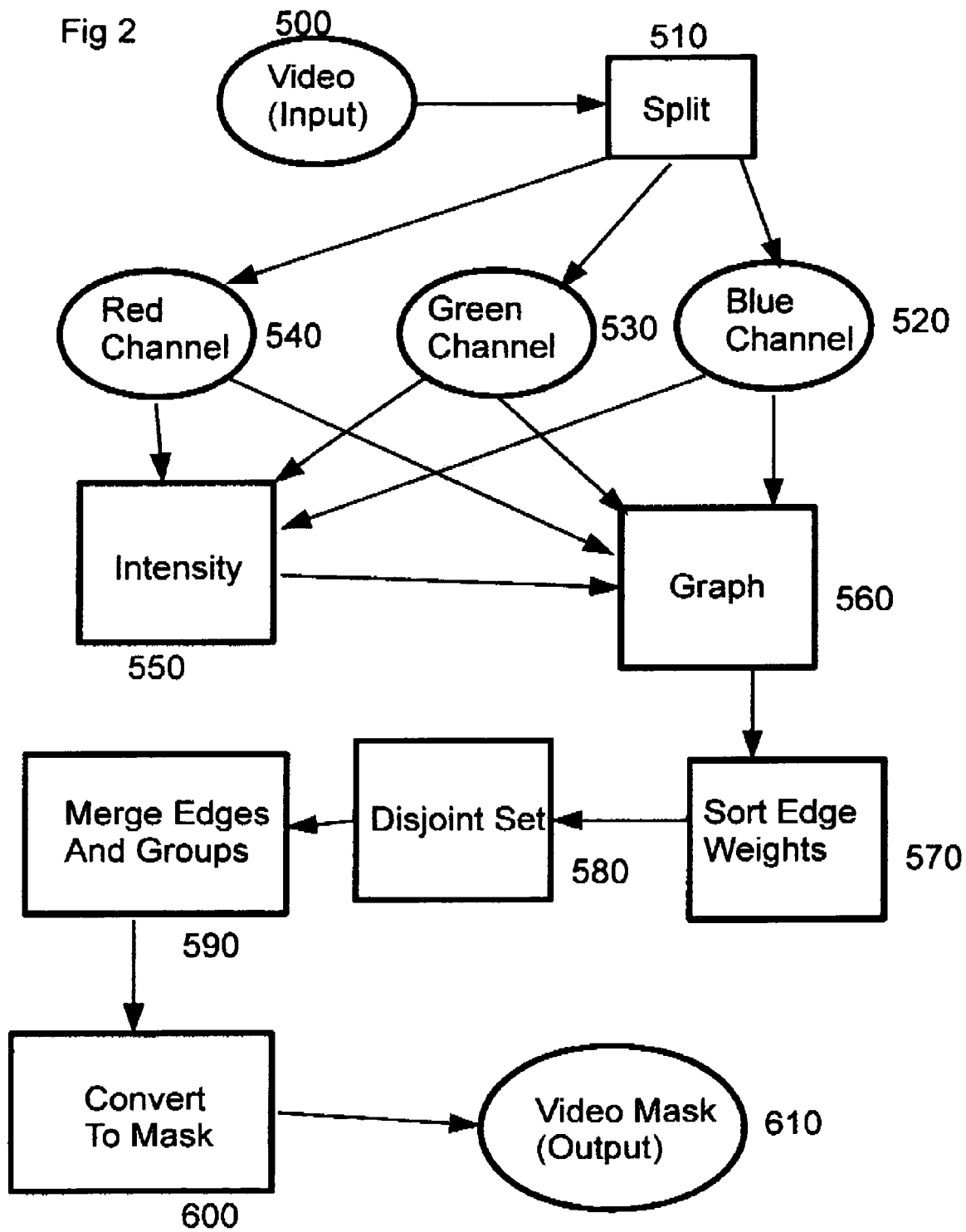
FIG. 2 is a flowchart for the segmentation process.

FIG. 2 illustrates an embodiment of the segmentation process. First, input video (500) is split into red (540), green (530), and blue (520) channels. Intensity (550) values are computed using the channels. Then using the intensity and color channels, a graph (560) is built in which the vertices are pixel indices and the edges are weighted based on a pixel difference metric using color channels and intensity. The graph is then sorted (570) based on edge weights and turned into a disjoint set (580). Based on computed thresholds, the edges are merged into groups (590) and then groups are merged in larger groups (590). Then the disjoint set is converted into a mask (600, 610), the output of the algorithm.

Figure 3:
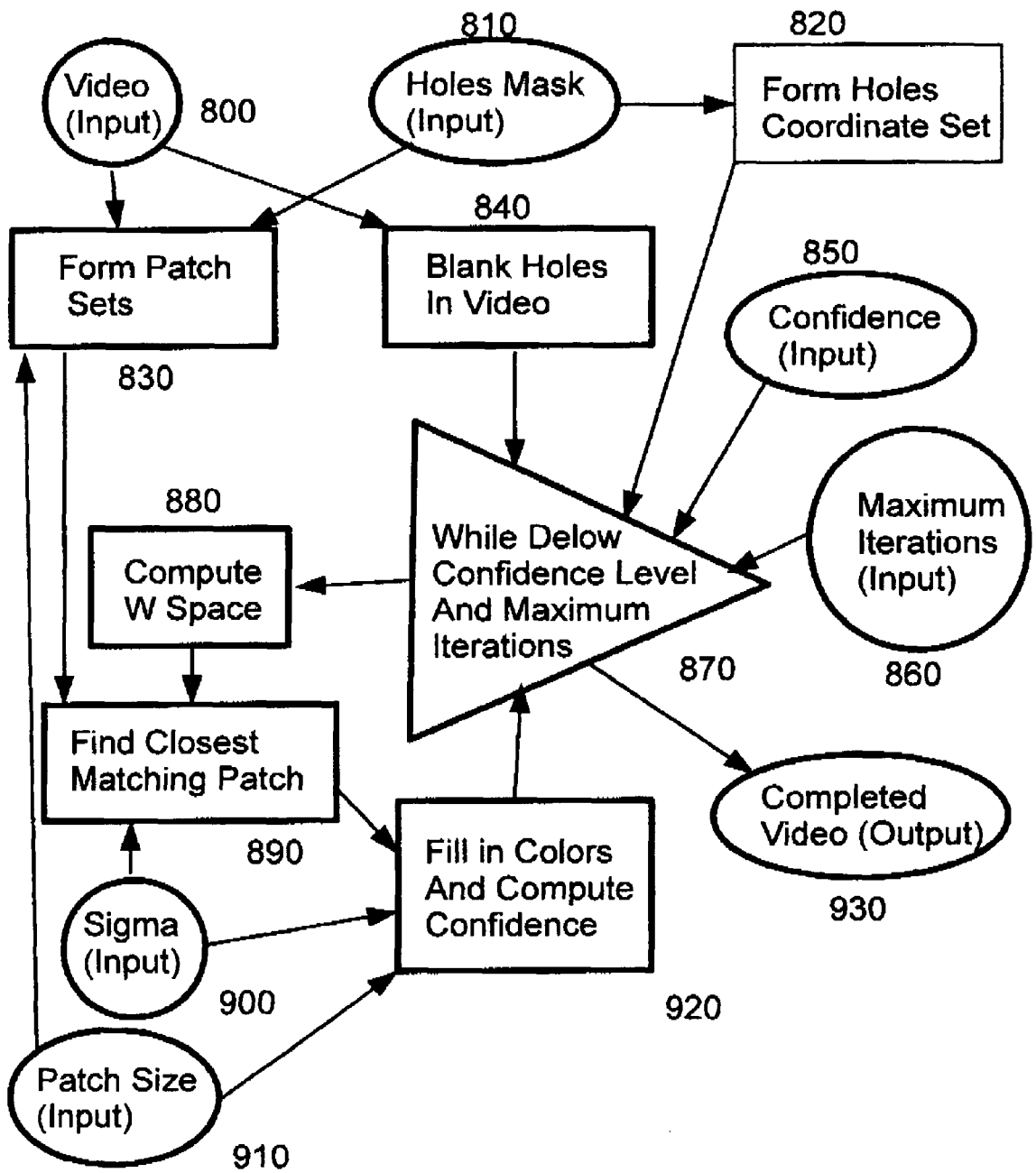
FIG. 3 is a flowchart of the space-time-completion process.

FIG. 3 illustrates an embodiment of the space-time completion process. Using the input video (800) and input mask (810) that indicates the regions of the video to complete or fill in, two sets of patches are extracted: those with holes and those without holes. A set of coordinates of the pixels (820) that are holes is generated using the mask. Also, the holes in the video are cleared to zero (840). Then the main loop of the process is entered (870) and continues while the confidence level of the filled in region is below the desired confidence (850) and the maximum number of iterations (860) has not been reached. The first step in the loop is to compute W space (880) and build a corresponding kd-tree. W space is the metric used to compare patches for similarity. Then, for each patch with a hole (830, 910), the closest patch is found (890, 900) using a kd-tree and recorded with a confidence level. Next, for each pixel with a hole, a new estimate for the color is computed and the confidence for the color is computed (920) and the overall confidence. Once the loop exits, the completed video is returned (930).

A set of films or videos are selected and digitized if not already in a digital format. From said set of films a customer chooses a scene and an actor to replace. Then a video is filmed with the customer acting as the actor in the scene. Depending on the video processing software used, a blue-screen or similar technology may be used but is not required. A matte of the customer is then extracted from the video.

Using video processing software, the actor is removed from the original film and the customer is inserted. The video is first undergoes video segmentation. The segmentation is refined through use of the video processing software through changing the parameters of the program and manual tweaking of-the segmentation. The segments are then combined into three pieces: a background, a foreground, and an actor mattes. Using the actor matte, video object removal replaces the actor with an estimated background. Then with standard video processing techniques the background, foreground, and customer mattes are combined to produce a scene in which the customer has replaced the actor with himself.

Many variations of the invention are possible. The original films can be preprocessed so that certain actors have already been deleted and the scenes are already segmented into foreground and background.

The fundamental algorithms needed for the video processing software are video segmentation and video object removal.

The code for video segmentation and video object removal is broken into three files: "av.h", "av.cpp", "av.i", and "SConstruct". The files "av.h" and "av.cpp" are C++ files (header and implementation files, respectfully) for compilation using gcc 3.3.6 or gcc 3.4.5 under Knoppix 4.0 with Python 2.4, Numarray 1.5.0, Python Imaging Library 1.1.5, a CVS copy of ffmpeg from Feb. 11, 2006, and Scons 0.96.91.D001. "av.i" is a SWIG 1.3.28 interface file for Python, and "SConstruct" is the file that directs the computer on how to compile the files. The resulting object code will be a library that can be called from python. These code files are attached as Appendix A to this application and are incorporated by reference in their entirety.

Inside "av.h" are the class and function declarations. "VideoWriteOnlyFile" and "VideoReadOnlyFile" are utility classes for reading and writing video files. They are wrappers over the ffmpeg library and may need to be updated based on the version of ffmpeg that is used. "CppSegmentVideo" is the header for the core video segmentation algorithm. "InpaintPatchSearch" is a class used in the space-time video completion section of the video processing software.

Within "av.cpp" there are located several classes. "_ImageGraph" is a graph with weighted edges. "_DisjointSet" is a disjoint.set tree implmenetation. "_Array3d" are helper classes that provide simple access to the array data used by "CppSegmentVideo" and "CppSegmentImage". "PixelDiff5d" computes the difference metric between pixels within the video. "_ProgressGuage" is a wrapper around the method used to track the progress of the algorithm. "_Patch" is a wrapper around a patch of pixels within the video.

To segment video the function "SegmentVideo" is called from a python script. First, the video is broken into red, green, and blue channels that are smoothed with a gaussian filter. Then "CppSegmentVideo" is called. First, it computes the "intensity" of each pixel where intensity is defined by the 2 norm of the vector <red,green,blue>. Then the image graph is built. All of the pixels are looked at, and for a subset of the surrounding pixels, the difference metric against them (as defined through PixelDiff5d) is computed. Then the graph is sorted based on its edges' weights. Next, a disjoint set is initialized used to generate the groupings. First, the graph edge weights are grouped based on whether they are less than a certain threshold. The threshold is updated each time groups are merged. Then the groupings are searched and if they are less then a minimum size, the groups are merged. Finally, a mask is generated in which each group is represented by one integer value and each pixel in a group has the same integer value;

A matte can be generated from the mask by setting all of a group's pixel mask to 1 and all other groups' pixel mask to 0. To composite the video and matte, "InpaintVideo" is used to remove undesired object after "SegmentVideo" and user interactive merging of groups. "SegmentVideo" along with user interactive merging of groups is used to generate a matte and extract an object from a second video data stream. Then the matte is merged with the second video data to produce a new video.

One can change "PixelDiff5d" to use image velocity or any other measure or metric in addition to or in place of the red, green, and blue values. For instance, one might just use intensity values.

Any data structure with an implementation that provides the same functionality as the graph and disjoint set. In addition, when the graph is generated, a different subset or all of the pixels surrounding a pixel may be used.

Groups can be further merged by interaction selection by a user. Different techniques may be used to fine-tune the matte. In addition, other techniques may be used to fill in the video data during object removal such as video epitomes or operation in the gradient domain.

In addition, "SegmentVideo" and "InpaintVideo" may be used to replace an object(s) within a video data stream. "SegmentVideo" along with user input to merge groups is used to in extract an object(s) from a video data stream(s) and indicate which object(s) from "InpaintVideo" to remove. Lighting and gamma correction techniques can then be used to adjust the video data stream.

"SegmentVideo" can be used as a step in classification of an object(s) and other computer vision uses for video (or images.) In one embodiment, this process can be performed using a computer with a processor in memory, such as, for example, an 3.40 GHz Pentium 4 processor-based computer with 2 GB of RDRAM employing a nVidia GeForce 6600 GT video card to process the inputted video files. The video files, in one embodiment are encoded using standard MPEG2 video compression, but any other standard video encoding routine may be used. Video, in this embodiment, was preferably stored digitally on magnetic media (a 80 GB hard drive) during processing, but video can be stored optically, such as on a DVD, or on any other media that is convenient to store the video prior to and post to processing. Software in one embodiment was created, for example, using Python 2.4.3 and C++ where it was executed and/or compiled on the system described above.

Accordingly, the reader will see that, according to the invention, video processing software can be utilized to manipulate a completed video to produce a new video in which an actor is replaced with a requested individual. Furthermore, the invention has the additional advantages in that:

most of the process can be automated through preprocessing of video, and individuals can see themselves in their favorite films as if they were actually shoot in the film.

While the above description contains many specifications, these should not be construed as limitations on the scope of the invention, but as exemplifications of the presently preferred embodiments thereof. Many other ramifications and variations are possible within the teachings of the invention. For example, the invention can be designed as a franchise with booths at popular locations like boardwalks or malls or an online service on a website or as a stand-alone kit. The specific algorithms to implement the needed functionality may be changed to use other methods such as optical flow, video epitomes, or other signal processing and machine learning algorithms.

Thus the scope of the invention should be determined by the appended claims and their legal equivalents, and not by the examples given.

The invention claimed is:

1. A process of generating a new video from a completed film or video and video of a person comprising:
    dividing said completed film into foreground and background and actor mattes;
    dividing said video of a person into person and background mattes;
    performing video space-time completion on the completed film where at least the actors mattes are substantially deleted;
    combining the person matte of the video with the foreground and background mattes of the completed film to produce a new video.

2. A method for replacing original people in a scene of a film with other people comprising the steps of:
    providing video of said other people, providing video of the film into which said people are to be inserted, processing the video of film with video processing software whereby, with user input to the software, a first matte including original people in the video of film and a second matte including the other people to be inserted are recognized, and conducting video space-time completion of the video of film whereby the first matte is removed from the video of film, and merging the second matte with the video of film.

3. A method for generating a new video from a film video and a person video comprising the steps of:
    segmenting automatically the person video into a person matte and a garbage matte;
    segmenting automatically the film video into a person matte, a foreground matte and a background matte;
    performing a video space-time-completion operation on the film video such that the person matte of the film video is substantially removed from the film video;
    combining the person matte of the person video with the film video which underwent video space-time-completion thereby producing the new video.

4. The method according to claim 3 wherein the space-time completion operation comprises the steps of:
    separating the film video into a set of patches with holes and a set of patches without holes as determined by a hole mask;
    determining a W space of the film video, said W space comprising:
        color components of each pixel of the video; and
        for each patch with holes, searching for a closest matching patch from the set of patches without holes by determining their similarity in W space;
    for each pixel in the patches with holes, replacing the color components of a pixel with weighed average color components of the closest matching patch;
    iterating the above steps starting from determining W space steps until a confidence measurement exceeds a pre-determined confidence level or a maximum number of iterations is reached.

* * * * *